United States Patent
Hoffmann et al.

(10) Patent No.: US 10,137,803 B2
(45) Date of Patent: Nov. 27, 2018

(54) LONGITUDINAL ADJUSTMENT MECHANISM FOR A VEHICLE SEAT

(71) Applicant: Adient Luxembourg Holding S.à.r.l., Luxembourg (LU)

(72) Inventors: Andreas Hoffmann, Wuelfrath (DE); David Balzar, Leichlingen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/559,587

(22) PCT Filed: Mar. 16, 2016

(86) PCT No.: PCT/EP2016/055684
§ 371 (c)(1),
(2) Date: Sep. 19, 2017

(87) PCT Pub. No.: WO2016/150791
PCT Pub. Date: Sep. 29, 2016

(65) Prior Publication Data
US 2018/0043797 A1 Feb. 15, 2018

(30) Foreign Application Priority Data
Mar. 20, 2015 (DE) .................. 10 2015 205 130

(51) Int. Cl.
*B60N 2/00* (2006.01)
*B60N 2/06* (2006.01)
(Continued)

(52) U.S. Cl.
CPC ............. *B60N 2/067* (2013.01); *B60N 2/075* (2013.01); *B60N 2/0705* (2013.01); *B60N 2/0715* (2013.01)

(58) Field of Classification Search
CPC ..................................................... B60N 2/0705
(Continued)

(56) References Cited

U.S. PATENT DOCUMENTS 5,816,555 A * 10/1998 Ito ........................ B60N 2/067
248/429
6,138,974 A * 10/2000 Okada .................. B60N 2/0232
248/429
(Continued)

FOREIGN PATENT DOCUMENTS

DE    199 12 978 A1    2/2000
DE    103 18 153 A1   12/2004
(Continued)

*Primary Examiner* — Steven M Marsh
(74) *Attorney, Agent, or Firm* — McGlew and Tuttle, P.C.

(57) ABSTRACT

A longitudinal adjustment mechanism (3) for a vehicle seat, in particular for a motor vehicle seat, includes at least one first seat rail (5) and at least one second seat rail (7) that is movable relative to the first seat rail (5). A spindle (11) is associated with the first seat rail (5) and cooperates with a gear mechanism (55) associated with the second seat rail (7). At least one spindle holder (20, 40, 80) secures the spindle (11) relative to the first seat rail (5). At least one floor attachment connects the first seat rail (5) to a vehicle structure. The floor attachment and the at least one spindle holder (20, 40, 80) are separate components.

20 Claims, 8 Drawing Sheets

(51) Int. Cl.
*B60N 2/07* (2006.01)
*B60N 2/075* (2006.01)

(58) Field of Classification Search
USPC .................................... 248/424, 429, 430
See application file for complete search history.

(56) References Cited

U.S. PATENT DOCUMENTS

| | | | | |
|---|---|---|---|---|
| 6,648,292 | B2* | 11/2003 | Flick | B60N 2/0705 248/430 |
| 9,511,685 | B2* | 12/2016 | Enokijima | B60N 2/067 |
| 9,586,500 | B2* | 3/2017 | Shimizu | B60N 2/067 |
| 9,751,430 | B2* | 9/2017 | Geiges | B60N 2/067 |
| 2010/0320352 | A1* | 12/2010 | Weber | B60N 2/067 248/429 |
| 2011/0079699 | A1* | 4/2011 | Tarusawa | B60N 2/067 248/430 |
| 2014/0374560 | A1 | 12/2014 | Speck et al. | |

FOREIGN PATENT DOCUMENTS

| | | |
|---|---|---|
| DE | 20 2005 000 317 U1 | 4/2005 |
| DE | 10 2004 001 593 B3 | 8/2005 |
| FR | 2 882 974 A1 | 9/2006 |

* cited by examiner

LONGITUDINAL ADJUSTMENT MECHANISM FOR A VEHICLE SEAT

CROSS REFERENCE TO RELATED APPLICATIONS

This application is a United States National Phase Application of International Application PCT/EP2016/055684, filed Mar. 16, 2016, and claims the benefit of priority under 35 U.S.C. § 119 of German Application 10 2015 205 130.7, filed Mar. 20, 2015, the entire contents of which are incorporated herein by reference.

FIELD OF THE INVENTION

The invention relates to a longitudinal adjustment mechanism for a vehicle seat, in particular for a motor vehicle seat, having at least one first seat rail, at least one second seat rail that is displaceable relative to the first seat rail, a spindle, assigned to the first seat rail, for interacting with a gearbox that is assigned to the second seat rail, and at least one spindle holder for fixing the spindle relative to the first seat rail, and a floor connection for connecting the first seat rail to a vehicle structure. The invention moreover relates to a vehicle seat.

BACKGROUND OF THE INVENTION

A longitudinal adjustment mechanism for a vehicle seat, having a first seat rail, a second seat rail that is displaceable relative to the first seat rail in the longitudinal direction of the rail, a spindle that is connected to the first seat rail by means of at least one spindle holder, and a gearbox that is motively powered, mounted on the second seat rail, and interacts with the spindle, wherein the spindle holder is composed of an at least partially deformed tubular section, is known from DE 103 18 153 A1. The spindle holder has a compressed lug-shaped portion, and a non-compressed tubular portion. The tubular portion serves for fastening to an end portion of the spindle. The flat lug-shaped portion has a bore which aligns with a fastening opening of the first seat rail such that, by fastening the latter by way of a floor-fastening screw, the spindle holder is also attached so as to be fixed to the vehicle structure and is thus connected to the first seat rail.

DE 10 2004 001 593 B3 discloses a method for the production of a spindle holder that is referred to as a fastening element for a longitudinal adjustment element for a vehicle seat, wherein in a first step a wire that has previously been cut to length in a defined manner is compressed to form a blank, and in a second step the blank is pressed so as to form the fastening element having the final external contour. The fastening element has a spindle bearing to which the spindle is welded. The fastening element in turn, by means of two cams which are provided on the lower side of the former that forms a contact face and which engage in a form-fitting manner in respective receptacles on a lower rail, is pre-positioned in a rotationally secured manner relative to said lower rail. The fastening element is fixedly connectable to the lower rail and to a vehicle floor pan by means of a screw which engages through a continuous fastening opening in a fastening flange of the fastening element.

A longitudinal adjustment mechanism for a vehicle seat, having at least one first seat rail, at least one second seat rail that is displaceable relative to the first seat rail, a spindle, assigned to the first seat rail, for interacting with a gearbox that is assigned to the second seat rail, and at least one spindle holder for fixing the spindle relative to the first seat rail and for spacing from the latter, is known from DE 20 2005 000 317 U1. The spindle holder is molded to the spindle and has a fastening flange for fastening to the first seat rail and through the latter to the vehicle structure.

The longitudinal adjustment mechanisms known from the prior art all have spindle holders which have an integrated floor connection for fastening a seat rail of the longitudinal adjustment mechanism to a vehicle structure. Different vehicle structures require different floor connections. This leads to a large diversity of variants of spindle holders and to correspondingly high tooling costs and pre-production costs.

SUMMARY OF THE INVENTION

The invention is based on an object of improving a longitudinal adjustment mechanism for a vehicle seat of the type mentioned at the outset, in particular of reducing a diversity of variants of spindle holders, and of providing a vehicle seat having a respective longitudinal adjustment mechanism.

This object is achieved according to the invention by a longitudinal adjustment mechanism for a vehicle seat, in particular for a motor vehicle seat, having at least one first seat rail, at least one second seat rail that is displaceable relative to the first seat rail, a spindle, assigned to the first seat rail, for interacting with a gearbox that is assigned to the second seat rail, and at least one spindle holder for fixing the spindle relative to the first seat rail, and a floor connection for connecting the first seat rail to a vehicle structure, wherein the floor connection and the spindle holder are components that are configured so as to be mutually separate.

On account of the floor connection and the at least one spindle holder being components that are configured so as to be mutually separate, the spindle holder can be configured so as to be independent from the vehicle structure. Different spindle holders for different vehicle structures are thus not required. A diversity of variants of spindle holders is thus reduced. Moreover, the spindle holder in comparison with spindle holders known from the prior art can be shorter in the longitudinal direction since said spindle holder does not have any floor connection. On account thereof, a limitation of the adjustment path by the spindle holder is reduced.

The floor connection and the at least one spindle holder can be disposed so as to be mutually spaced apart such that the floor connection and the at least one spindle holder are not in mutual contact. Alternatively, the floor connection and the at least one spindle holder can contact one another without being directly interconnected.

The longitudinal adjustment mechanism can be connected to a vehicle structure by means of different floor connections which, for example, can be selectable from a parts bin of different floor connections. The spindle holders herein can be identical parts.

The floor connection can be a screw. The floor connection can be a screw which runs through a through bore of a first rail of the longitudinal adjustment mechanism and screw-fits the longitudinal adjustment mechanism to a vehicle structure. The floor connection can be an adapter. The floor connection can be an adapter foot. The floor connection can have a plurality of components. The rail section of the first seat rail is not a component part of the floor connection. All components of the floor connection are configured so as to be separate from the spindle holder. Preferably, at least one first seat rail of the longitudinal adjustment mechanism is provided for bearing directly on a vehicle floor pan. Vehicle-specific adapter parts can thus be dispensed with.

At least one component of the floor connection can be welded to the first seat rail. At least one component of the floor connection can be screw-fitted to the first seat rail. At least one component of the floor connection can be riveted to the first seat rail. At least one component of the floor connection can be connected to the first seat rail in a form-fitting and/or a force-fitting and/or a materially integral manner.

The spindle connection to the first seat rail can be established by means of a spindle holder in a forward end region of the spindle. The spindle connection to the first seat rail can be established by means of a spindle holder in a rearward end region of the spindle. The spindle connection to the first seat rail can be established in each case by means of one spindle holder in a forward end region of the spindle and in a rearward end region of the spindle. The spindle holders can be identical parts.

One spindle end can be fastened to a seat rail by means of a spindle holder that is configured so as to be separate from the floor connection. A second spindle end herein can be fastened to the seat rail by means of a spindle holder that is configured conjointly with the floor connection. Both spindle ends can also be fastened to a seat rail in each case by means of a spindle holder that is configured so as to be separate from the floor connection.

At least one spindle holder can be welded to the first seat rail. At least one spindle holder can be screw-fitted to the first seat rail. At least one spindle holder can be riveted to the first seat rail. At least one spindle holder can be connected to the first seat rail in a form-fitting and/or a force-fitting and/or a materially integral manner.

The at least one spindle holder can have two flanges which run so as to be mutually parallel at a spacing and receive one end of the spindle. On account thereof, the spindle is secured in a form-fitting manner in at least one spatial direction. The end of the spindle that is disposed between the flanges is preferably shaped as a double flat. A double flat is geometrically simple and therefore can be molded in a cost-effective manner. The end of the spindle that is disposed between the flanges is fixedly connected, preferably welded, to the flanges.

The first seat rail can be a lower rail. The first seat rail can be an upper rail. The first seat rail can be an internal rail. The first seat rail can be an external rail.

In order for the spindle holder to be pre-positioned on the seat rail, the spindle holder can have one or a plurality of elements, preferably cams, extensions, or legs, which are plug-fitted into complementary openings in the seat rail prior to the spindle holder being welded to the seat rail.

The at least one spindle holder can have one web, two first limbs, two second limbs, and two flanges. The spindle holder can be a delta-shaped bracket. The spindle holder can be welded to the first seat rail by way of a lap weld and/or a hollow weld. The at least one spindle holder has two flanges which are interconnected by means of a web. The spindle holder can be an H-shaped bracket.

The at least one spindle holder preferably has a means for pre-positioning the at least one spindle holder on the first seat rail. The means for pre-positioning can be plugged-fitted into an opening, in particular an opening that is configured as a notch, of the first seat rail and be welded to said seat rail in particular at the edges in each case by means of one I-shaped seam. A spindle holder can have a plurality of means for pre-positioning.

The longitudinal adjustment mechanism according to the invention has a separation of the connection of the spindle holders from the floor connection/connection of the adapter feet. A connection of the spindle holders to the rail by virtue of a minor dimension in the longitudinal direction can be established without or with only a minor limitation of the adjustment path.

The connection of the spindle at the front and the rear can be established by short standardized spindle holders which are configured as angle brackets and which are connected to the rail by laser welding. Connections to the vehicle floor, or to the adapter feet, respectively, can be established independently thereof in the region in front of/behind the spindle connection.

The seat rails can be already painted at the point of time of welding of spindle holders. In this case, the paint is to be partially removed by using a marking laser in the region of laser welding.

The object is moreover achieved by a vehicle seat having a longitudinal adjustment mechanism according to the invention. A vehicle seat according to the invention has all advantages of the longitudinal adjustment mechanism according to the invention as have been described above. The invention is explained in more detail hereunder by means of advantageous exemplary embodiments that are illustrated in the figures. However, the invention is not limited to these exemplary embodiments. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
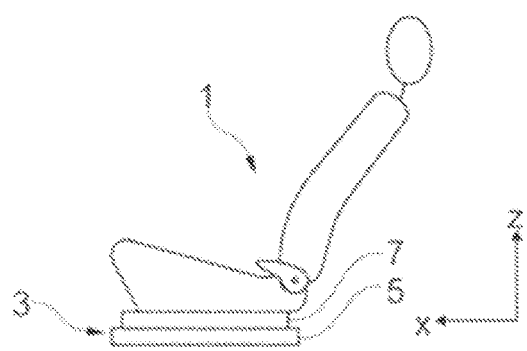
FIG. 1 is a schematic side view of a vehicle seat.
Figure 2:
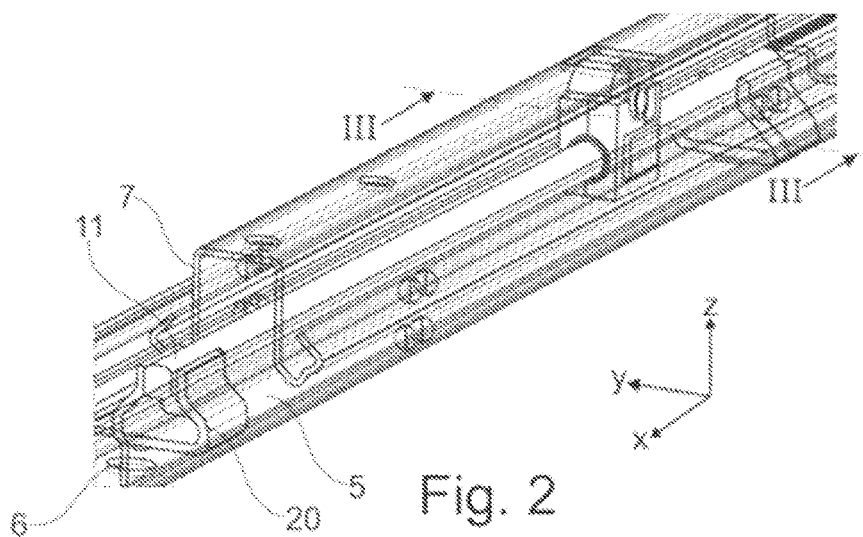
FIG. 2 is a perspective view of a fragment of a longitudinal adjustment mechanism according to a first exemplary embodiment, in a transparent illustration.
Figure 3:
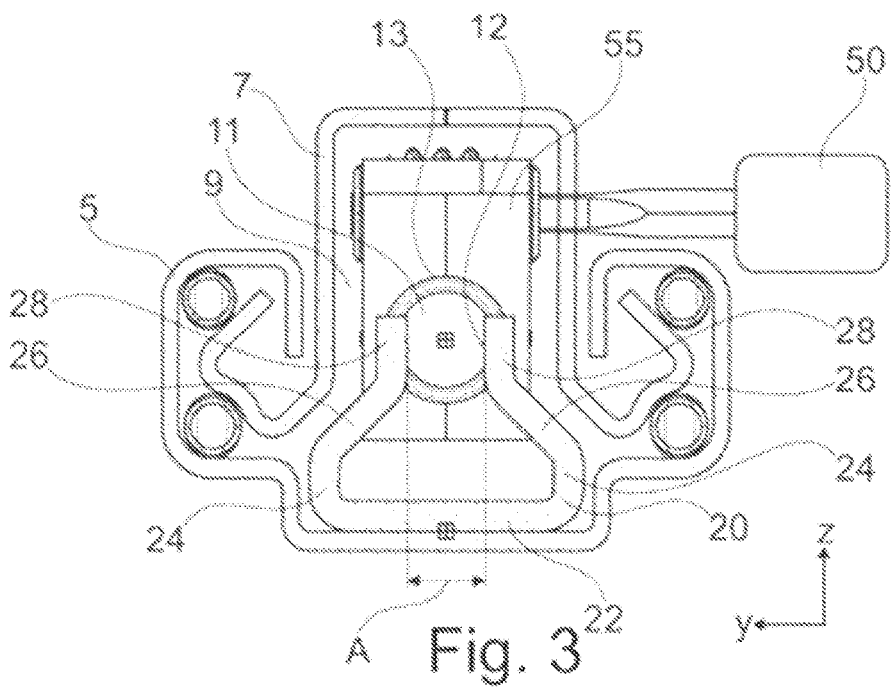
FIG. 3 is a section along the line III-III in FIG. 2.

Referring to the drawings, a vehicle seat 1 that is schematically illustrated in FIG. 1 will be described hereunder using three spatial directions that run in a mutually perpendicular manner. A longitudinal direction x in the case of a vehicle seat 1 that is installed in a vehicle runs largely horizontally and preferably so as to be parallel with a longitudinal direction of the vehicle, the latter usually corresponding to the usual traveling direction of the vehicle. A transverse direction y that runs perpendicularly to the longitudinal direction x in the vehicle is likewise aligned horizontally and runs so as to be parallel with a transverse direction of the vehicle. A vertical direction z runs perpendicularly to the longitudinal direction x and perpendicularly to the transverse direction y. In the case of a vehicle seat 1 that is installed in the vehicle, the vertical direction z runs so as to be parallel with the vertical axis of the vehicle. The positional and directional details used, such as, for example, front, rear, top, and bottom, relate to a viewing direction of a passenger sitting in a normal sitting position in the vehicle seat 1. However the vehicle seat 1 according to the invention can also be installed in an alignment deviating therefrom, for example so as to be transverse to the traveling direction.

The vehicle seat 1 for modifying the longitudinal position of the seat has a motively driven longitudinal adjustment mechanism 3 having one pair of seat rails on each side of the vehicle seat. The pair of seat rails is in each case composed of a lower rail as a first seat rail 5 that is connectable to the vehicle structure, and of an upper rail as a second seat rail 7 that is fixed to the seat structure. The first seat rail 5 and the second seat rail 7 encompass one another in an alternating manner known per se, and are mounted on one another so as to be displaceable in the longitudinal direction x.

FIGS. 2 to 5 show a first exemplary embodiment of a longitudinal adjustment mechanism 3 according to the invention. The two seat rails 5, 7 form an interdisposed installation space 9. A spindle 11 which is connected to the first seat rail 5 is disposed in the longitudinal direction x of the pair of seat rails 5, 7 within the installation space 9, the external side of said spindle 11 forming a thread 13. A gearbox 55 which is driveable by a motor 50 of the longitudinal adjustment mechanism 3 and which is mounted in a housing that is fixedly connected to the second seat rail 7, has, apart from further gearbox elements that are intermeshed, a spindle nut which is disposed on the spindle 11 so as to mesh with the thread 13 and is displaceable relative to said spindle 11. When the motor 50 drives the gearbox 55, the latter is displaced along the spindle 11 while entraining the second seat rail 7 and an upper structure of the vehicle seat 1 that is connected to said second seat rail 7.

A spindle holder 20 is fastened to a forward end of the spindle 11. A further spindle holder 20 is preferably also fastened to a rearward end of the spindle 11. The spindle holder 20 serves for fastening the spindle 11 to the first seat rail 5. The spindle 11 by means of the first spindle holder 20 is spaced apart from the first seat rail 5 and is secured relative to the latter.

The first seat rail 5 is connectable to a vehicle structure. To this end, the first seat rail 5 has an opening 6 which presently serves as a screw through bore through which a screw which is screw-fittable into an internal thread, in particular into a weld nut, that is connected to the vehicle structure can be guided. The screw serves as a floor connection of the first seat rail 5 to the vehicle structure. As a modification to the exemplary embodiment, the first seat rail 5 is connected to the vehicle structure not by means of a screw but by means of another floor connection, for example by means of a rivet or of an adapter that is connected to the first seat rail 5.

The spindle holder 20 has one web 22, two first limbs 24, two second limbs 26, and two flanges 28. The web 22 has a planar quadrangular, in particular rectangular, basic shape and in the vehicle seat 1 is aligned so as to be parallel with the longitudinal direction x and parallel with the transverse direction y. One of the two first limbs 24 is in each case adjacent to two opposite sides of the web 22. The two first limbs 24 each have a planar rectangular basic shape and in the vehicle seat 1 are aligned so as to be parallel with the longitudinal direction x and parallel with the vertical direction z. Each of the two first limbs 24 is connected to the web 22 by means of in each case one curved transitional region.

In each case one of the two second limbs 26 adjoins on a side of each first limb 24 that faces away from the web 22. The two second limbs 26 each have a planar rectangular basic shape and, proceeding from the first limbs 24, converge in an oblique manner. The two second limbs 26 are in each case connected to one of the two first limbs 24 by means of a curved transitional region.

One of the two flanges 28 adjoins on a side of each second limb 26 that faces away from the first limbs 24. The two flanges 28 each have a planar rectangular basic shape and in the vehicle seat 1 are aligned so as to be parallel with the longitudinal direction x and parallel with the vertical direction z. The two flanges 28 each are connected to in each case one of the two second limbs 26 by means of a curved transitional region. The two flanges 28 of the spindle holder 20 run so as to be mutually parallel at a spacing A.

Figure 4:
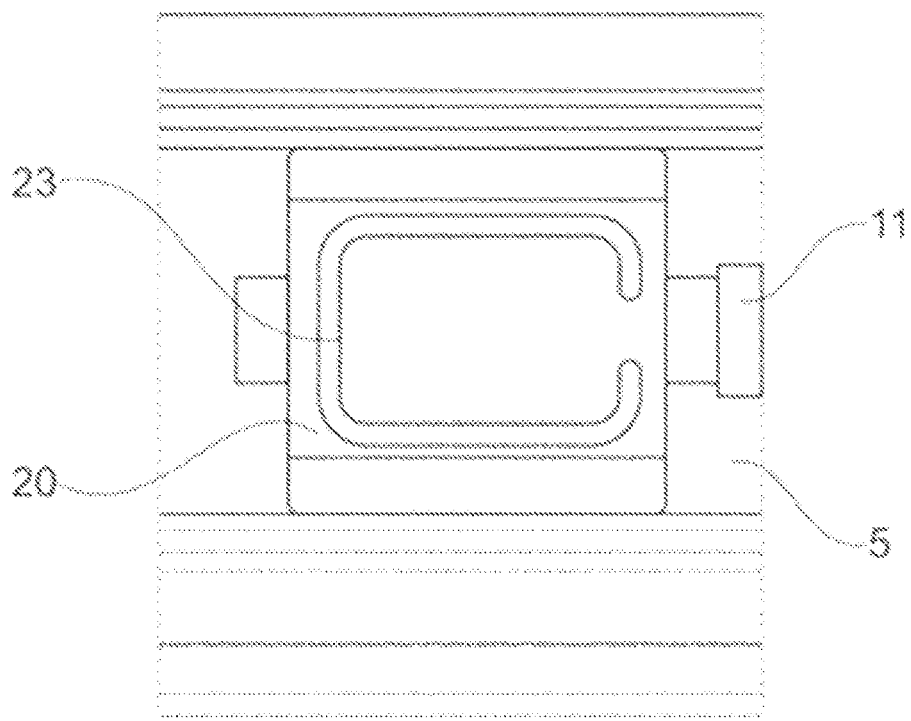
FIG. 4 is a lower view of a fastening region between a spindle holder and a first seat rail of the longitudinal adjustment mechanism from FIG. 2, in a transparent illustration.
Figure 5:
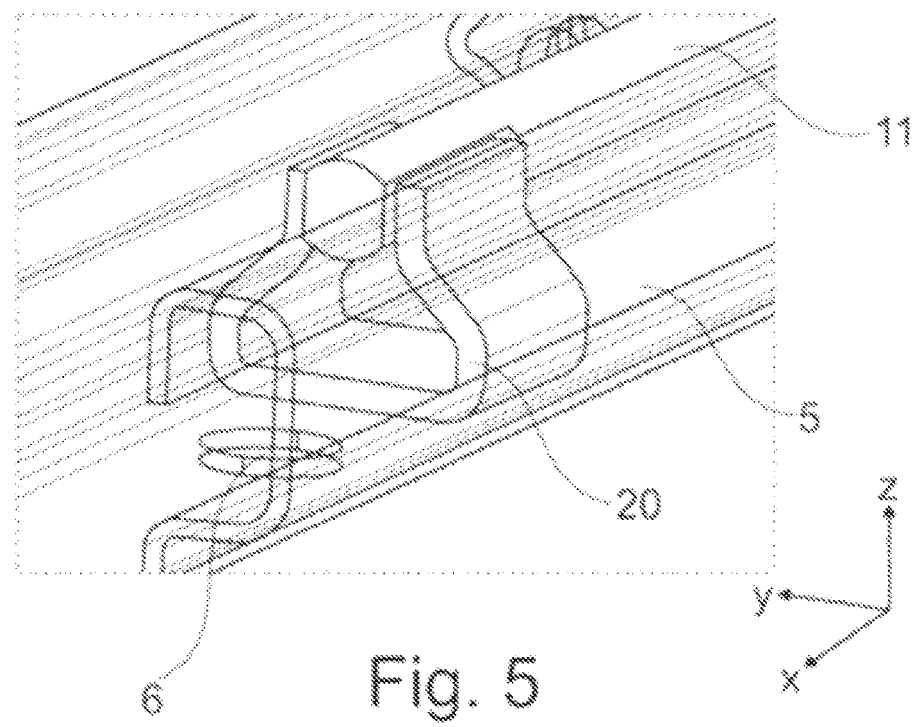
FIG. 5 is a detailed view from FIG. 2.
Figure 6:
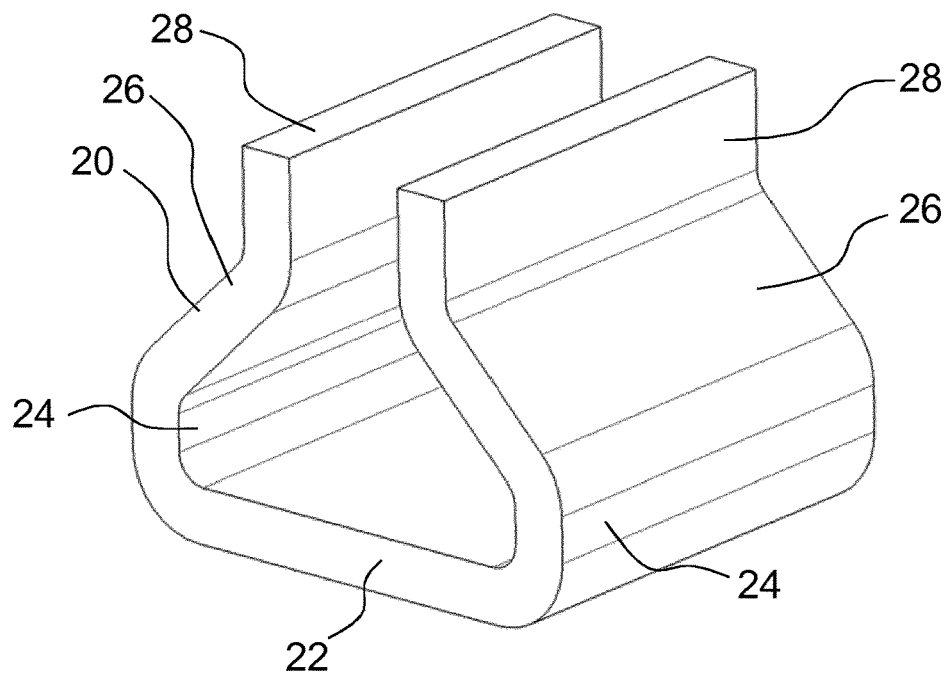
FIG. 6 is a perspective view of a spindle holder according to a second exemplary embodiment.
Figure 7:
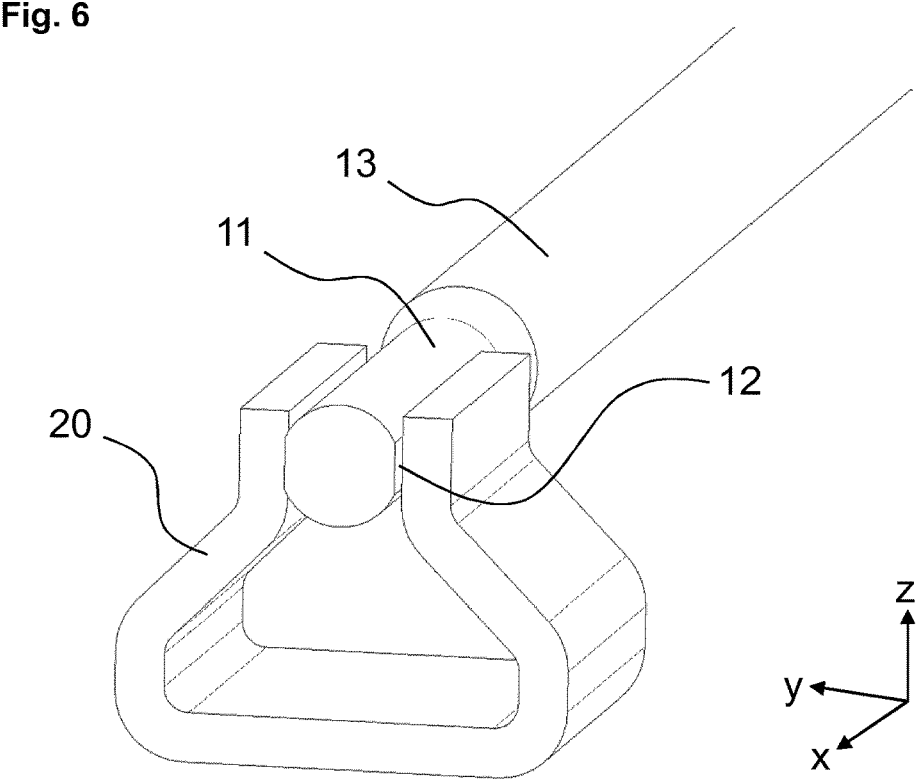
FIG. 7 is a perspective view of a spindle holder and of a spindle of the second exemplary embodiment.
Figure 8:
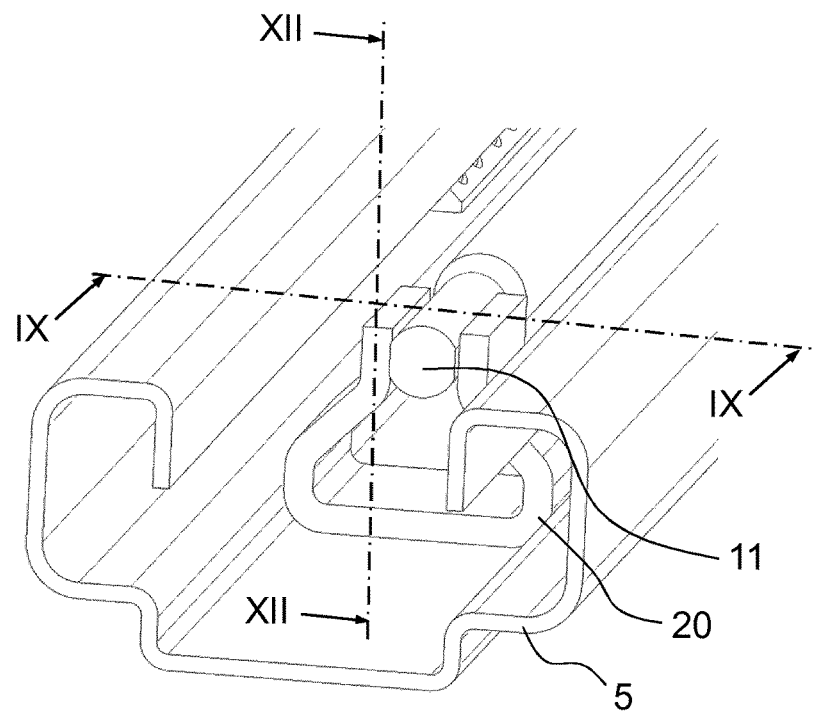
FIG. 8 is a perspective view of a spindle holder, of a spindle, and of a first seat rail of the second exemplary embodiment.
Figure 9:
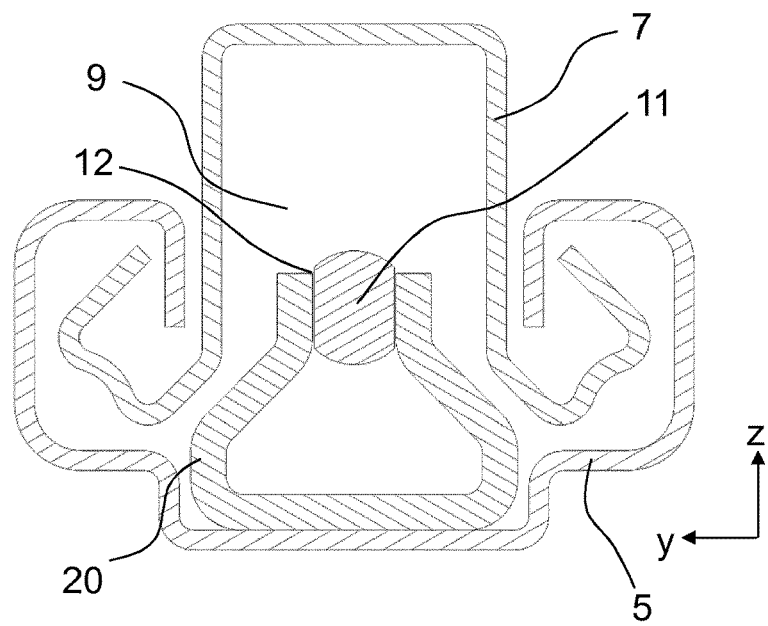
FIG. 9 is a sectional view taken along the line IX-IX in FIG. 8.
Figure 10:
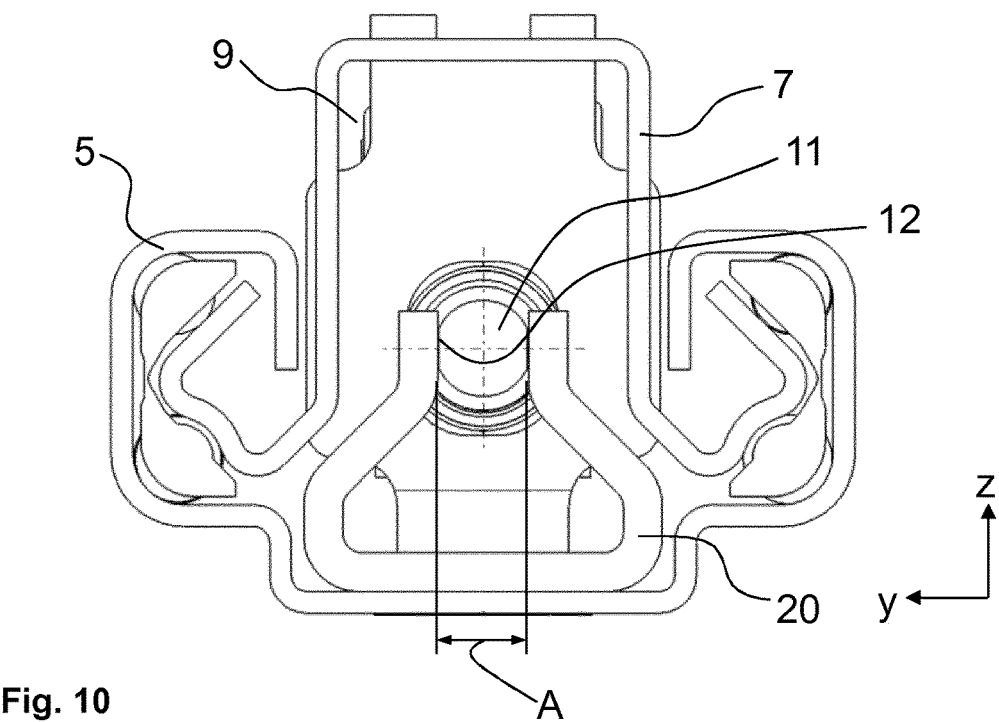
FIG. 10 is a front view of the longitudinal adjustment mechanism of the second exemplary embodiment.
Figure 11:
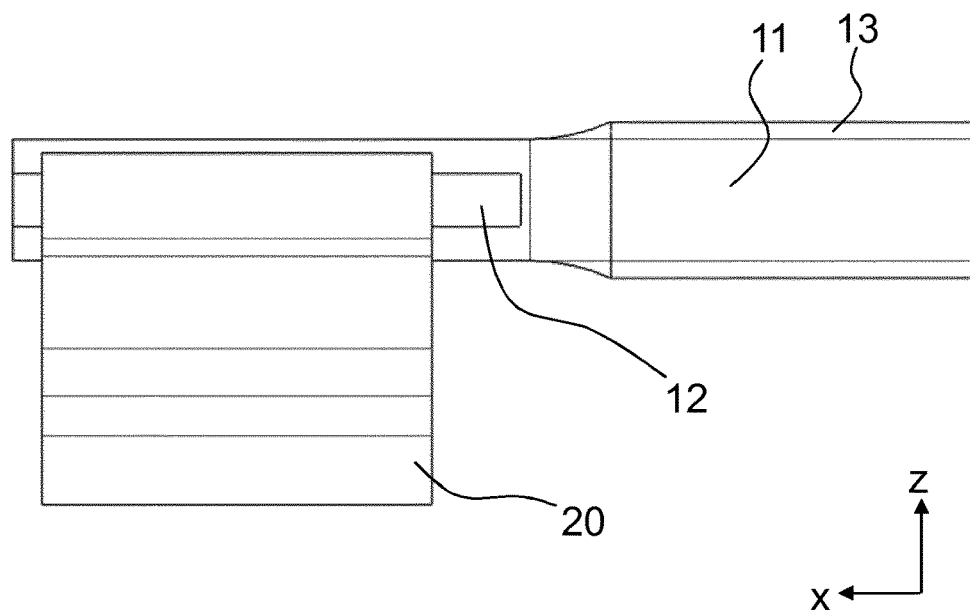
FIG. 11 is a side view of the spindle holder and of the spindle of the second exemplary embodiment.
Figure 12:
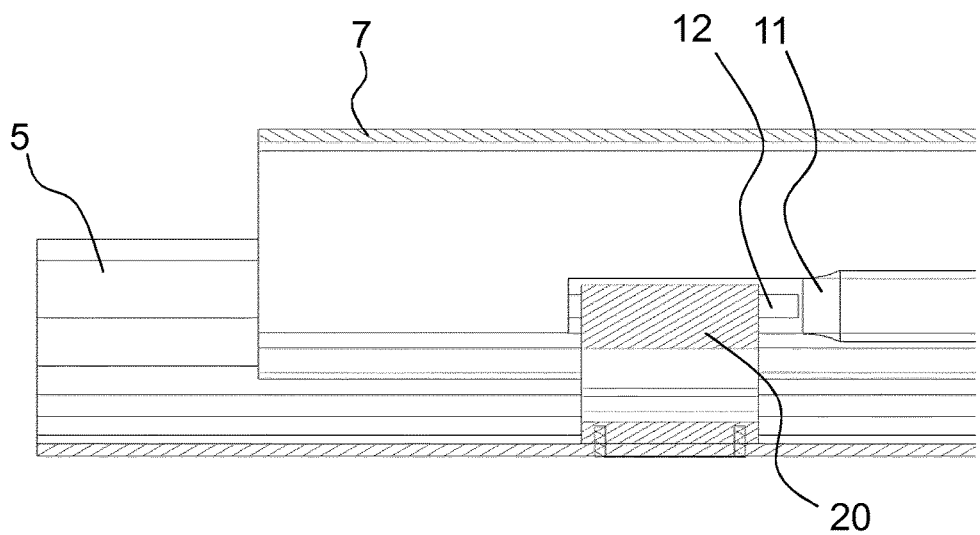
FIG. 12 is a sectional view taken along the line XII-XII in FIG. 8.

The web 22 of the spindle holder 20 bears on a floor face of the first seat rail 5 and is welded to the latter by means of a weld seam 23. As can be seen in FIG. 4, the weld seam 23 is configured in a C-shape. The weld seam 23 is presently generated by laser welding but could also be generated by means of another welding method. The spindle holder 20 that is fastened to the forward region of the first seat rail 5, when viewed in the longitudinal direction x and in the traveling direction, is disposed behind the opening 6 that serves as a screw through bore. As a modification to the exemplary embodiment, the spindle holder 20 is screw-fitted or riveted to the first seat rail 5.

At least one of two end regions of the spindle 11 has a circular basic shape which is provided with a double flat 12. The double flat 12 is formed by two parallel faces which are spaced apart at the same spacing A as the two flanges 28, but likewise behind the opening 6.

The double flat 12 of one end region of the spindle 11 is disposed between the two flanges 28 and is welded to the latter, preferably by means of laser welding. The spindle 11 is thus fixedly connected to the first rail 5 by way of the spindle holder 20. The spindle 11 in each of two end regions thereof is preferably connected to the first rail 5 in a corresponding manner by means of a spindle holder 20.

Herein, one opening 6 is disposed in front of the forward spindle holder 20, and one further opening is disposed behind a rearward spindle holder.

A second exemplary embodiment of a longitudinal adjustment mechanism 3 according to the invention is illustrated in FIGS. 6 to 12. The second exemplary embodiment corresponds to the first exemplary embodiment to the extent that no deviating description is made hereunder. Identical or functionally equivalent components of the first and of the second exemplary embodiment therefore have the same reference signs. As opposed to the first exemplary embodiment, a first seat rail 5 does not have any opening as a through bore for a floor connection by means of a screw. The floor connection can be an adapter (not illustrated in the figures), for example, which is fastened, in particular welded, to the first seat rail 5.

Figure 13:
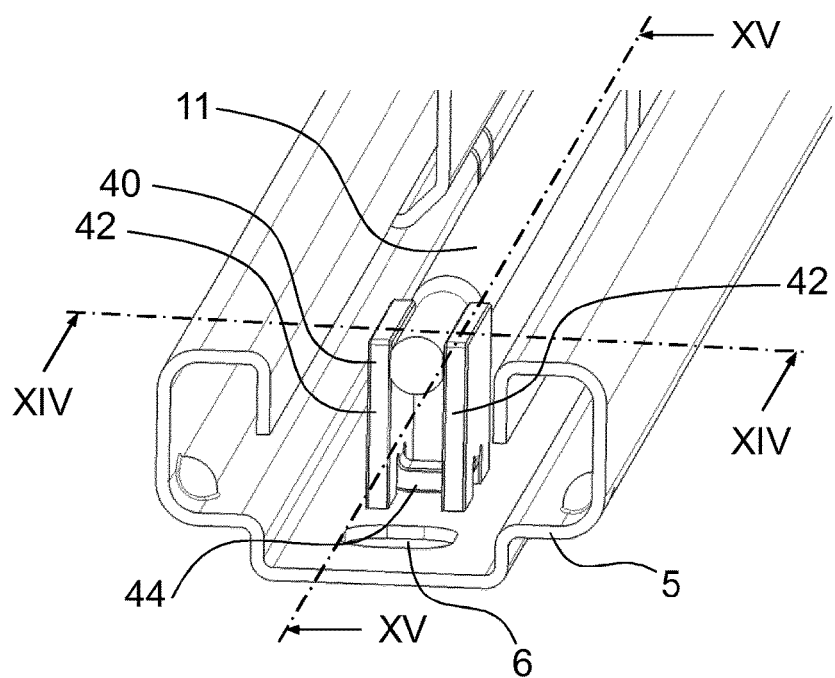
FIG. 13 is a perspective view of a spindle holder, of a spindle, and of a first seat rail according to a third exemplary embodiment.
Figure 14:
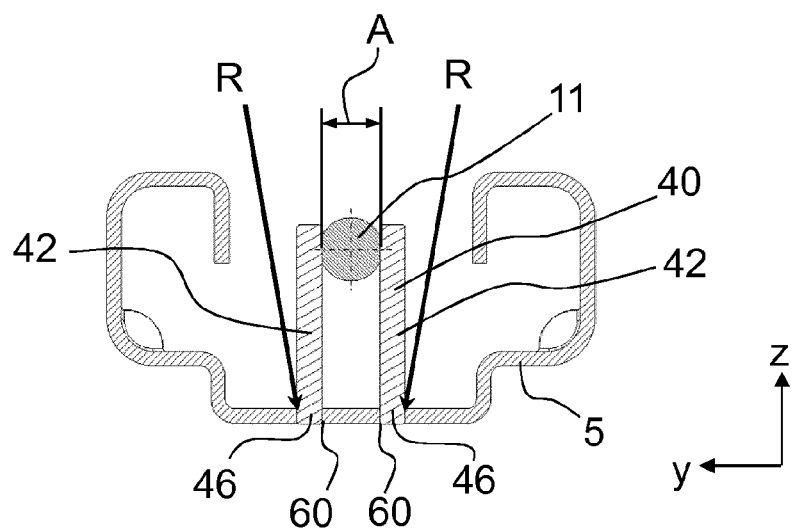
FIG. 14 is a sectional view along the line XIV-XIV in FIG. 13.
Figure 15:
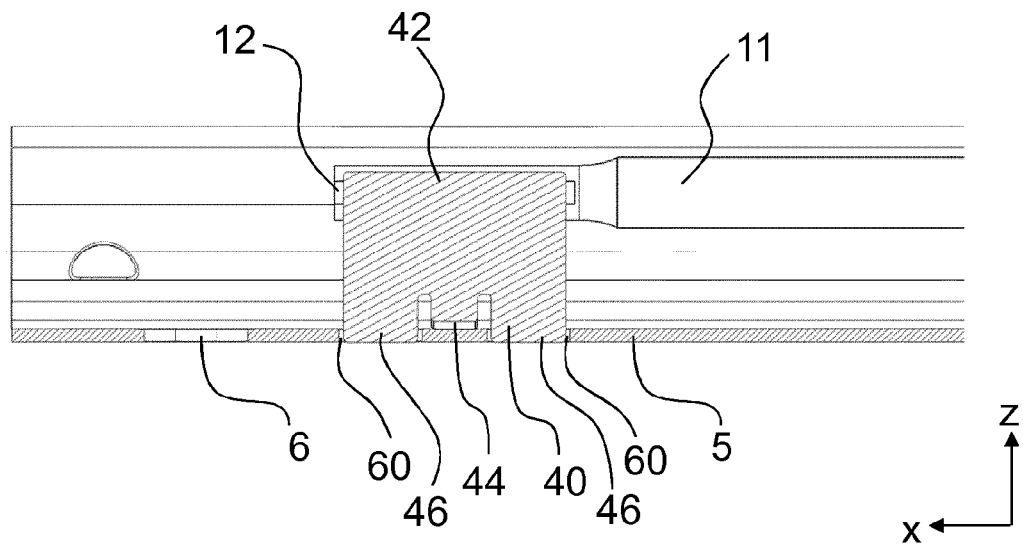
FIG. 15 is a sectional view along the line XV-XV in FIG. 13.

A third exemplary embodiment of a longitudinal adjustment mechanism 3 according to the invention is illustrated in FIGS. 13 to 15. The third exemplary embodiment corresponds to the first exemplary embodiment to the extent that no deviating description is made hereunder. Identical or functionally equivalent components of the first and of the third exemplary embodiment therefore have the same reference signs.

A spindle holder 40 is disposed on a forward end of a spindle 11, the function and arrangement of said spindle holder 40, with the exception of the points of differentiation that will be mentioned hereunder, corresponding to those of the spindle holder 20 of the first exemplary embodiment. The spindle holder 40 is configured so as to be H-shaped. The spindle holder 40 has two flanges 42 which are interconnected by means of a web 44. The two flanges 42 each have a planar rectangular basic shape and are aligned so as to be parallel with the longitudinal direction x and parallel with the vertical direction z. The two flanges 42 of the spindle holder 40 run so as to be mutually parallel at a spacing A.

Each of the two flanges 42 of the spindle holder 40 has two pins 46 which are oriented in the direction of a floor face of the first seat rail 5. The pins 46 have a rectangular cross section and engage in notches 60 in the floor face of the first seat rail 5 that are shaped in a complementary manner. The pins 46 are welded to the first seat rail 5, preferably by means of laser welding. FIG. 14 shows the welding direction R from which a laser beam impacts the joint between the pins 46 and the first seat rail 5 during the welding process and generates an I-shaped seam.

Figure 16:
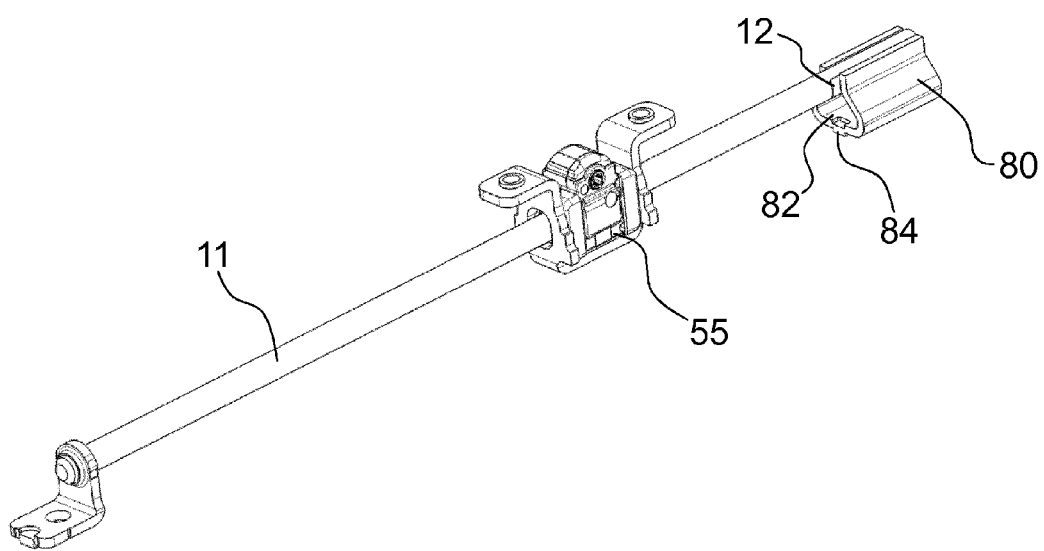
FIG. 16 is a perspective view of a spindle having a conventional spindle holder and spindle holder according to a fourth exemplary embodiment according to the invention.

FIG. 16 shows a perspective view of a spindle 11 having a conventional spindle holder having an integrated floor connection at a first spindle end, and a spindle holder 80 according to a fourth exemplary embodiment at a second spindle end, said spindle holder 80 being configured so as to be separate from a floor connection. FIG. 16 moreover shows a gearbox 55 which is screw-fitted to the spindle 11. As a modification to the fourth exemplary embodiment, the spindle 11 instead of the conventional spindle holder at the first spindle end likewise has a spindle holder 80 that is configured so as to be separate from a floor connection.

The spindle holder 80 in terms of the shape thereof, with the exception of the points of differentiation that will be described hereunder, corresponds to the spindle holder 20 of the first and of the second exemplary embodiment. The length of the spindle holder 80 in the longitudinal direction x can deviate from the length of the spindle holder 20 of the first and of the second exemplary embodiment. Moreover, the spindle holder 80 has a cam 84 that protrudes in particular counter to the vertical direction z from a web 82 for fitting into a corresponding notch of the first seat rail 5. The cam 84 serves for pre-positioning the spindle holder 80 on the first seat rail 5 prior to the spindle holder 80 being welded to the first seat rail 5. As a further modification to the exemplary embodiment, the web 82 has a plurality of such cams 84. The spindle holders 20 of the first and of the second exemplary embodiment can also be advantageously enhanced by such a cam.

The features disclosed in the above description, the claims and the drawings may be significant both individually and in combination with one another for implementing the invention in the various design embodiments thereof.

Even though the invention has been described in detail in the drawings and in the illustration above, the illustrations are to be understood as being illustrative and exemplary, and not as restrictive. In particular, the selected proportions of the individual elements illustrated in the drawings is not to be interpreted as being necessary or restrictive. Furthermore, the invention is in particular not restricted to the exemplary embodiments discussed. Further variants of the invention and of the embodiment thereof will emerge to a person skilled in the art from the above disclosure, from the figures and from the claims.

Expressions used in the claims such as "comprise", "have", "include", "contain" and the like do not exclude further elements or steps. The use of the indefinite article does not exclude a multiplicity. A single device may perform the functions of several of the units or devices mentioned in the claims.

While specific embodiments of the invention have been shown and described in detail to illustrate the application of the principles of the invention, it will be understood that the invention may be embodied otherwise without departing from such principles.

The invention claimed is:

1. A longitudinal adjustment mechanism for a vehicle seat, the longitudinal adjustment mechanism comprising:
   at least one first seat rail;
   at least one second seat rail that is displaceable relative to the first seat rail;
   a spindle assigned to the first seat rail, for interacting with a gearbox that is assigned to the second seat rail;
   at least one spindle holder fixing the spindle relative to the first seat rail; and
   a floor connection for connecting the first seat rail to a vehicle structure, wherein:
   the floor connection and the at least one spindle holder are components that are configured so as to be mutually separate; and
   the at least one spindle holder has one web, two first limbs, two second limbs, and two flanges; or
   the at least one spindle holder is H-shaped, wherein the at least one spindle holder has two flanges which are interconnected by means of a web.

2. The longitudinal adjustment mechanism as claimed in claim 1, wherein the spindle is fixed to the first seat rail by means of two spindle holders, of which exactly one spindle holder is configured so as to be separate from the floor connection.

3. The longitudinal adjustment mechanism as claimed in claim 1, wherein the at least one spindle holder comprises two spindle holders and the spindle is fixed to the first seat rail by means of the two spindle holders, both of the two spindle holders being configured so as to be separate from the floor connection.

4. The longitudinal adjustment mechanism as claimed in claim 1, wherein the at least one spindle holder is welded to the first seat rail by means of at least one weld seam.

5. The longitudinal adjustment mechanism as claimed in claim 1, wherein the at least one spindle holder is welded to the first seat rail by at least one of a lap weld and a hollow weld.

6. The longitudinal adjustment mechanism as claimed in claim 1, wherein the at least one spindle holder has the two flanges, which run so as to be mutually parallel at a spacing and receive one end of the spindle.

7. The longitudinal adjustment mechanism as claimed in claim 6, wherein the end of the spindle that is disposed between the flanges is shaped as a double flat.

8. The longitudinal adjustment mechanism as claimed in claim 7, wherein an end of the spindle, that is disposed between the flanges, is welded to the flanges.

9. The longitudinal adjustment mechanism as claimed in claim 1, wherein the at least one spindle holder has means for pre-positioning the at least one spindle holder on the first seat rail.

10. The longitudinal adjustment mechanism as claimed in claim 1, wherein the floor connection and the at least one spindle holder are disposed so as to be mutually spaced apart.

11. A vehicle seat comprising a longitudinal adjustment mechanism, the longitudinal adjustment mechanism comprising:
at least one first seat rail;
at least one second seat rail that is displaceable relative to the first seat rail;
a spindle assigned to the first seat rail, for interacting with a gearbox that is assigned to the second seat rail;
at least one spindle holder fixing the spindle relative to the first seat rail; and
a floor connection for connecting the first seat rail to a vehicle structure, wherein:
the floor connection and the at least one spindle holder are components that are configured so as to be mutually separate; and
the at least one spindle holder has one web, two first limbs, two second limbs, and two flanges; or
the at least one spindle holder is H-shaped, wherein the at least one spindle holder has two flanges which are interconnected by means of a web.

12. The vehicle seat as claimed in claim 11, wherein at least one first seat rail is provided for bearing directly on a vehicle floor pan.

13. The vehicle seat as claimed in claim 12, wherein the spindle is fixed to the first seat rail by means of two spindle holders, of which exactly one spindle holder is configured so as to be separate from the floor connection.

14. The vehicle seat as claimed in claim 12, wherein the at least one spindle holder comprises two spindle holders and the spindle is fixed to the first seat rail by means of the two spindle holders, both of the two spindle holders being configured so as to be separate from the floor connection.

15. The vehicle seat as claimed in claim 12, wherein the at least one spindle holder is welded to the first seat rail by means of at least one weld seam.

16. The vehicle seat as claimed in claim 12, wherein the at least one spindle holder is welded to the first seat rail by at least one of a lap weld and a hollow weld.

17. The vehicle seat as claimed in claim 12, wherein the at least one spindle holder has the two flanges, which run so as to be mutually parallel at a spacing and receive one end of the spindle.

18. The vehicle seat as claimed in claim 17, wherein the end of the spindle that is disposed between the flanges is shaped as a double flat.

19. The vehicle seat as claimed in claim 18, wherein an end of the spindle, that is disposed between the flanges, is welded to the flanges.

20. The vehicle seat as claimed in claim 12, wherein the at least one spindle holder has means for pre-positioning the at least one spindle holder on the first seat rail.

\* \* \* \* \*